United States Patent Office 3,360,357
Patented Dec. 26, 1967

3,360,357
DERIVATIVES OF PYRIDAZONE AND A METHOD FOR THEIR USE AS HERBICIDES
Franz Reicheneder and Franz Winter, Ludwigshafen (Rhine), and Adolf Fischer, Mutterstadt, Pfalz, Germany, and Karl Dury, deceased, late of Kirchheimbolanden, Pfalz, Germany, by Franz Winter, representative of the heirs, Ludwigshafen (Rhine), Germany, assignors to Badische Anilin- & Soda-Fabrik Aktiengesellschaft, Ludwigshafen (Rhine), Germany
No Drawing. Filed Aug. 3, 1966, Ser. No. 570,090
Claims priority, application Germany, Aug. 14, 1965, B 83,269
5 Claims. (Cl. 71—92)

The present invention relates to new pyridazone derivatives. It relates particularly to pyridazone derivatives which contain a cycloalkenyl radical and which have good herbicidal action.

It is an object of the invention to provide new and valuable pyridazone derivatives. Another object of the invention is to provide a process for controlling unwanted plants, particularly between crop plants without damaging the latter.

It is known that 1-phenyl-4-amino-5-chloropyridazone-6 (A) and 2-chloro-4,6-bis-(ethylamino)-s-triazine (B) may be used as active ingredients for herbicides. Their action is however unsatisfactory.

We have found that herbicidal mixtures which contain a pyridazone derivative having the general formula

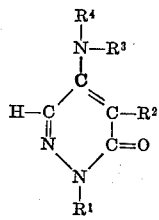

in which $R^1$ denotes a cyclohexenyl or cyclooctenyl radical, $R^2$ denotes a chlorine, bromine or iodine atom or a methoxy or thiomethyl radical, $R^3$ denotes a hydrogen atom, $R^4$ denotes a hydrogen atom or $\alpha$-hydroxy $\beta$-trichloroethyl or $\alpha$-hydroxy-$\beta$-tribromoethyl or —$NH_2$ or —CO—$R^5$, in which $R^5$ denotes a lower alkyl radical which may contain chlorine as a substituent or

—NH—$C_6H_5$ or —$COOR^6$ or —CH=CH—$COOR^6$ in which $R^6$ denotes a hydrogen atom or a methyl or ethyl radical or $R^3$ and $R^4$ together denote the radical

—CO—CH=CH—CO— or

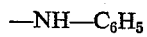

in which $R^7$ denotes a hydrogen atom or a methyl radical, have a good effect.

The new active ingredients may be prepared by reaction of 4-halopyridazones with ammonia or hydrazine or by reaction of 4-aminopyridazones with the corresponding reactants.

The production of some of the active ingredients will now be described in detail:

(I) 1-cyclohexenyl-4-amino-5-chloropyridazone-(6): 25 parts (by weight) of 1-cyclohexenyl-4,5-dichloropyridazone-(6) is mixed with 200 parts of concentrated aqueous ammonia and heated in an autoclave for six hours at 120° C. The substance which separates from the mixture is recrystallized from methanol and then has a melting point of 156° to 157° C.

(II) 1-cyclohexenyl-4-($\alpha$-hydroxy-$\beta',\beta',\beta'$-trichloroethyl)-amino-5-chloropyridazone-(6): 2 parts (by weight) of 1-cyclohexenyl-4-amino-5-chloropyridazone-(6) is heated with 10 parts of chloral until it is dissolved. The solution is then cooled and water is added. 3.2 parts of the chloral compound having a melting point of 136° to 138° C. crystallizes out.

(III) 4-(1-cyclohexenyl-5-chloropyridazone-(6))-yl-oxamic acid: 5 parts (by weight) of 1-cyclohexenyl-4-amino-5-chloropyridazone-(6) is boiled under reflux with 50 parts of oxalyl chloride for five minutes. A clear solution forms which is allowed to cool; water is added. 4-(1-cyclohexenyl-5-chloropyridazone-(6))-yl-oxamic acid crystallizes out and is recrystallized from acetic acid. 5.5 parts of the pure product is obtained having the melting point 176° to 178° C. (with decomposition).

The following are examples of other active substances:

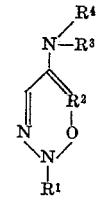

| $R^1$ | $R^2$ | $R^3$ | $R^4$ | M.P. |
|---|---|---|---|---|
| cyclohexenyl | Cl | H | H | 156 to 157° C. |
| cyclohexenyl | Br | H | H | 165 to 16° C.7 |
| cyclohexenyl | Cl | H | —CH(OH)CCl₃ | 136 to 13° C.8 |
| cyclohexenyl | Cl | H | —CO—COOH | 176 to 178° C., decompoition; s |

Herbicides in accordance with this invention may be prepared in the conventional way by mixing the active ingredient with solid or liquid carrier substances, for example water, hydrocarbons, clay, fertilizers, borax or kieselguhr. It is also possible to add wetting agents, dispersing agents and adhesives as well as other biologically active substances.

The following examples illustrate the use of the herbicides and their advantages over prior art herbicides.

*Example 1*

Seeds of beet (*Beta vulgaris*), Indian corn (*Zea mays*), wild mustard (*Sinapis arvensis*), common goosefoot (*Chenopodium album*), small nettle (*Urtica urens*), gallant soldier (*Galinsoga parviflora*), amaranth (*Amaranthus retroflexus*) and annual meadow grass (*Poa annua*) are sown in plastics pots having a diameter of 8 cm. in a greenhouse and treated on the same day with compounds (I), (II) and (III) and, for comparison, with 1-cyclohexyl-4-amino-5-chloropyridazone-(6) (C). The rate of application is 2 kg. per hectare dispersed in an amount of water equivalent to 500 liters per hectare.

The results of the experiment may be seen from the following table:

| | Active ingredient | | | |
|---|---|---|---|---|
| | I | II | III | C |
| Crop plants: | | | | |
| Beet | 0 | 0 | 0 | 20-30 |
| Indian corn | 0 | 0 | 0 | 0-10 |
| Unwanted plants: | | | | |
| Wild mustard | 100 | 100 | 100 | 80 |
| Common goosefoot | 90-100 | 90-100 | 90-100 | 80 |
| Small nettle | 100 | 100 | 100 | 90 |
| Gallant soldier | 90 | 90 | 90 | 80 |
| Amaranth | 90-100 | 90-100 | 90-100 | 80-90 |
| Annual meadow grass | 90 | 90 | 90 | 70-80 |

0=no damage; 100=total destruction.

A biological action similar to that exhibited by compounds I, II and III is also shown in this example and in Examples 2, 3 and 4 by the following compounds:

1-cyclohexenyl-4-amino-5-bromopyridazone-6
1-cyclooctenyl-4-amino-5-chloropyridazone-6
1-cyclooctenyl-4-amino-5-bromopyridazone-6
4-(1-cyclohexenyl-5-bromopyridazone-6)-yl-oxamic acid
4-(1-cyclooctenyl-5-chloropyridazone-6)-yl-oxamic acid
1-cyclohexenyl-4-(α-hydroxy-β',β',β'-trichloroethyl)-amino-5-bromo-pyridazone-6
1-cyclooctenyl-4-(α-hydroxy-β',β',β'-trichloroethyl)-amino-5-chloropyridazone-6
1-cyclooctenyl-4-(α-hydroxy-β',β',β'-trichloroethyl)-amino-5-bromopyridazone-6
1-cyclohexenyl-4-chloroacetylamino-5-chloropyridazone-6
1-cyclohexenyl-4-chloroacetylamino-5-bromopyridazone-6
1-cyclohexenyl-4-acetylamino-5-chloropyridazone-6
1-cyclohexenyl-4-acetylamino-5-bromopyridazone-6
1-cyclohexenyl-4-isobutyrylamino-5-chloropyridazone-6
1-cyclohexenyl-4-isobutyrylamino-5-bromopyridazone-6
1-cyclohexenyl-4-(α-hydroxy-β',β',β'-tribromoethyl)-amino-5-chloropyridazone-6
1-cyclohexenyl-4-(α-hydroxy-β',β',β'-tribromoethyl)-amino-5-bromopyridazone-6
N-phenyl-N'-(1-cyclohexenyl-5-chloropyridazone-6-one-4-yl)-urea
N-phenyl-N'-(1-cyclohexenyl-5-bromopyridazone-6-one-4-yl)-urea
N-(4-(1-cyclohexenyl-5-choropyridazone-6)-yl)-N-dimethylformamidine
N-(4-(1-cyclohexenyl-5-bromopyridazone-6)-yl)-N-dimethylformamidine
N-(4-(1-cyclohexenyl-5-chloropyridazone-6)-yl)-N-methylformamidine
N-(4-(1-cyclohexenyl-5-bromopyridazone-6)-yl)-N-methylformamidine
1-cyclohexenyl-4-hydrazino-5-chloropyridazone-6
1-cyclohexenyl-4-hydrazino-5-bromopyridazone-6
N-(4-(1-cyclohexenyl-5-chloropyridazone-6)-yl)-maleamic acid
N-(4-(1-cyclohexenyl-5-bromopyridazone-6)-yl)-maleamic acid
N-(4-(1-cyclohexenyl-5-bromopyridazone-6)-yl)-maleic imide
ethyl-N-(4-(1-cyclohexenyl-5-bromopyridazone-6)-yl)-oxamate.

*Example 2*

The plants beet (*Beta vulgaris*), Indian corn (*Zea mays*), potatoes (*Solanum tuberosum*), wild mustard (*Sinapis arvensis*), common goosefoot (*Chenopodium album*), small nettle (*Urtica urens*), gallant soldier (*Galinsoga parviflora*), amaranth (*Amaranthus retroflexus*) and annual meadow grass (*Poa annua*) are treated at a growth height of 3 to 4 cm. with compounds I, II and III and, for comparison, with compound C. The rate of application is 2 kg. of active ingredient per hectare dispersed in an amount of water equivalent to 500 liters per hectare. Three weeks later it is evident that compounds I, II and III have a stronger herbicidal action on the weeds and weed grasses than the compound C.

The results of the experiment are to be seen in the following table:

| | Active ingredient | | | |
|---|---|---|---|---|
| | I | II | III | C |
| Crop plants: | | | | |
| Beet | 10 | 0 | 10 | 40-50 |
| Indian corn | 0 | 0 | 0 | 0-10 |
| Potatoes | 0 | 0 | 0-10 | 10 |
| Unwanted plants: | | | | |
| Wild mustard | 90-100 | 100 | 100 | 80 |
| Common goosefoot | 100 | 100 | 100 | 80-90 |
| Small nettle | 90-100 | 90-100 | 90-100 | 80 |
| Gallant soldier | 80 | 80 | 80 | 70 |
| Amaranth | 90 | 90-100 | 90-100 | 80 |
| Annual meadow grass | 90-100 | 90-100 | 90-100 | 90 |

0=no damage; 100=total destruction.

*Example 3*

A field which has been sown with seed of wild mustard (*Sinapis arvensis*), white goosefoot (*Chenopodium album*), small nettle (*Urtica urens*), gallant soldier (*Galinsoga parviflora*), amaranth (*Amaranthus retroflexus*) and annual meadow grass (*Poa annua*) is treated on the day of sowing with the compounds I, II and III and, for comparison, with compound B. The rate of application is 5 kg. of active ingredient per hectare dispersed in an amount of water equivalent to 500 liters per hectare. After emergence of the weeds and weed grasses it is evident that compounds I, II and III have a stronger herbicidal action than B. After four weeks almost all the plants are completely withered.

*Example 4*

A field which is overgrown with wild mustard (*Sinapis arvensis*), common goosefoot (*Chenopodium album*), gallant soldier (*Galinsoga parviflora*), small nettle (*Urtica urens*), amaranth (*Amaranthus retroflexus*), annual meadow grass (*Poa annua*) and slender foxtail (*Alopecurus myosuroides*) is treated with compounds I, II and III, and, for comparison, with compound B. The rate of application is 5 kg. of active ingredient per hectare dispersed in an amount of water equivalent to 500 liters per hectare. A few days later it can be seen that compounds I, II and III have a stronger herbicidal action than B. Three weeks later almost all the plants are completely withered.

We claim:
1. Pyridazone derivatives having the formula

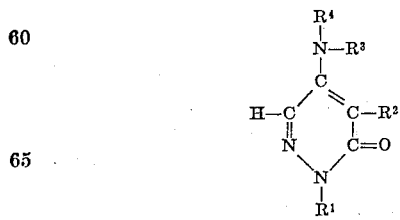

in which $R^1$ denotes cyclohexenyl cyclooctenyl, $R^2$ denotes chlorine, bromine, iodine, methoxy or thiomethyl, $R^3$ denotes hydrogen, $R^4$ denotes hydrogen, α-hydroxy-β-trichloroethyl, α-hydroxy-β-tribromoethyl, $-NH_2$ or $-CO-R^5$ in which $R^5$ denotes lower alkyl, chlorosubstituted lower alkyl, the $-NH-C_6H_5$, $-COOR^6$ or $-CH=CH-COOR^6$ in which $R^6$ denotes hydrogen, methyl or ethyl, or R³ and R⁴ together denote —CO—CH=CH—CO— or

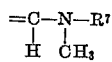

in which R⁷ denotes hydrogen or methyl.

2. A method of controlling unwanted plant growth which comprises treating the plants or the soil in which the plants are growing or are to grow with a phytotoxic amount of the pyridazone derivative

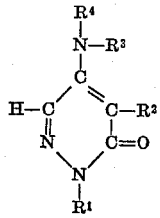

in which R¹ denotes cyclohexenyl cyclooctenyl, R² denotes chlorine, bromine, iodine, methoxy or thiomethyl, R³ denotes hydrogen, R⁴ denotes hydrogen, α-hydroxy-β-trichloroethyl, α-hydroxy-β-tribromoethyl, —NH₂ or —CO—R⁵ in which R⁵ denotes lower alkyl, chlorosubstituted lower alkyl, the —NH—C₆H₅, —COOR⁶ or —CH=CH—COOR⁶ in which R⁶ denotes hydrogen, methyl or ethyl, or R³ and R⁴ together denote

—CO—CH=CH—CO— or

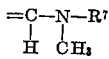

in which R⁷ denotes hydrogen or methyl.

3. 1-cyclohexenyl-4-amino-5-chloropyridazone-6.
4. 1 - cyclohexenyl - 4 - (α-hydroxy-β',β',β'-trichloroethyl)-amino-5-chloropyridazone-6.
5. 4-(1 - cyclohexenyl - 5 - chloropyridazone - 6) - yl-oxamic acid.

No references cited.

NICHOLAS S. RIZZO, *Primary Examiner.*

UNITED STATES PATENT OFFICE
CERTIFICATE OF CORRECTION

Patent No. 3,360,357                      December 26, 1967

Franz Reicheneder et al.

It is certified that error appears in the above identified patent and that said Letters Patent are hereby corrected as shown below:

In the heading to the printed specification, line 4, cancel "and Franz Winter". Column 2, in the table, fifth column, line 2 thereof, "165 to 16° C.7" should read -- 165 to 167° C. --; same table, fifth column, line 3 thereof, "136 to 13° C.8" should read -- 136 to 138° C. --; same table, fifth column, line 4 thereof, "decompoition.s" should read -- decomposition --.

Signed and sealed this 16th day of December 1969.

(SEAL)
Attest:

Edward M. Fletcher, Jr.                  WILLIAM E. SCHUYLER, JR.
Attesting Officer                           Commissioner of Patents